US010771062B1

(12) United States Patent
Muchsel et al.

(10) Patent No.: US 10,771,062 B1
(45) Date of Patent: *Sep. 8, 2020

(54) SYSTEMS AND METHODS FOR ENHANCING CONFIDENTIALITY VIA LOGIC GATE ENCRYPTION

(71) Applicant: Maxim Integrated Products, Inc., San Jose, CA (US)

(72) Inventors: Robert Michael Muchsel, Addison, TX (US); Donald Wood Loomis, III, Coppell, TX (US); Edward Tangkwai Ma, Plano, TX (US); Hung Thanh Nguyen, Plano, TX (US); Nancy Kow Iida, Irving, TX (US); Mark Alan Lovell, Lucas, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/100,130

(22) Filed: Aug. 9, 2018

Related U.S. Application Data

(63) Continuation of application No. 15/645,562, filed on Jul. 10, 2017, now Pat. No. 10,063,231, which is a
(Continued)

(51) Int. Cl.
*H03K 19/003* (2006.01)
*H04L 9/08* (2006.01)

(52) U.S. Cl.
CPC ..... *H03K 19/00315* (2013.01); *H04L 9/0861* (2013.01); *H04L 9/0866* (2013.01); *H04L 2209/24* (2013.01)

(58) Field of Classification Search
CPC ............ H03K 19/00315; H04L 9/0861; H04L 9/0866
(Continued)

(56) References Cited

U.S. PATENT DOCUMENTS 6,757,831 B1 * 6/2004 Folmsbee ........... G06F 9/30145
712/E9.028
6,965,675 B1 * 11/2005 Trimberger ............. G06F 21/76
380/277
(Continued)

OTHER PUBLICATIONS

First Office Action for Chinese Patent Application No. 201510807636.1, dated Oct. 8, 2019, 6 pgs.
(Continued)

*Primary Examiner* — Khalil Naghdali
(74) *Attorney, Agent, or Firm* — North Weber and Baugh LLP

(57) ABSTRACT

Presented are systems and methods that allow hardware designers to protect valuable IP and information in the hardware domain in order to increase overall system security. In various embodiments of the invention this is accomplished by configuring logic gates of existing logic circuitry based on a key input. In certain embodiments, a logic function provides results that are dependent not only on input values but also on an encrypted logic key that determines connections for a given logic building block, such that the functionality of the logic function cannot be determined by reverse engineering. In some embodiments, the logic key is created by decrypting a piece of data using a secret or private key. Advantages of automatic encryption include that existing circuitry need not be re-implemented or re-built, and that the systems and methods presented are backward compatible with standard manufacturing tools.

20 Claims, 13 Drawing Sheets

Related U.S. Application Data continuation of application No. 14/659,348, filed on Mar. 16, 2015, now Pat. No. 9,705,501.

(60) Provisional application No. 62/058,564, filed on Oct. 1, 2014.

(58) Field of Classification Search
USPC .......................................................... 380/277
See application file for complete search history.

(56) References Cited

U.S. PATENT DOCUMENTS

| | | | | |
|---|---|---|---|---|
| 7,606,362 B1* | 10/2009 | Streicher | ............... | H04L 9/0631 380/29 |
| 7,984,305 B2* | 7/2011 | Ochi | ....................... | H04L 9/003 380/259 |
| 8,009,827 B2* | 8/2011 | Okochi | .................. | G06F 21/72 380/265 |
| 8,364,960 B2* | 1/2013 | Baroffio | ................ | G06F 21/554 370/389 |
| 8,879,727 B2* | 11/2014 | Taylor | .................. | H04L 9/0618 380/255 |
| 8,879,827 B2* | 11/2014 | Aviv | ........................ | G06T 7/593 382/154 |
| 2002/0150252 A1* | 10/2002 | Wong | ...................... | G06F 21/76 380/277 |
| 2002/0166058 A1* | 11/2002 | Fueki | ..................... | G06F 21/85 713/194 |
| 2004/0223618 A1* | 11/2004 | Dellow | ................ | H04L 9/0631 380/277 |
| 2006/0186919 A1* | 8/2006 | Verma | .............. | H03K 19/17728 326/41 |
| 2006/0265603 A1* | 11/2006 | McLean | .................. | G06F 21/76 713/189 |
| 2008/0219448 A1* | 9/2008 | Almeida | ................ | H04L 9/065 380/277 |
| 2009/0067632 A1* | 3/2009 | Nakano | .................. | H04L 9/0894 380/277 |
| 2009/0110188 A1* | 4/2009 | Dolgunov | ................. | G06F 7/58 380/28 |
| 2009/0132821 A1* | 5/2009 | Matsuzaki | ............ | H04L 9/0877 713/170 |
| 2010/0229069 A1* | 9/2010 | Yamaguchi | ............. | G06F 21/10 714/752 |
| 2011/0255694 A1* | 10/2011 | Miyauchi | .............. | H04L 9/0894 380/277 |
| 2012/0230492 A1* | 9/2012 | Fujisaki | ................ | H04L 9/0637 380/277 |
| 2014/0044265 A1* | 2/2014 | Kocher | ................... | H04L 9/083 380/277 |
| 2015/0304105 A1* | 10/2015 | Shi | ........................ | H04L 9/0825 713/193 |
| 2015/0379276 A1* | 12/2015 | Glickman | ............. | G06F 21/602 713/193 |

OTHER PUBLICATIONS

First Office Action dated Nov. 14, 2019 in the related Chinese Patent Application No. 201510807636.1, (6 pgs).

* cited by examiner

SYSTEMS AND METHODS FOR ENHANCING CONFIDENTIALITY VIA LOGIC GATE ENCRYPTION

CROSS REFERENCE TO RELATED PATENT APPLICATIONS

This application is a continuation of U.S. patent application Ser. No. 15/645,562, entitled "SYSTEMS AND METHODS FOR ENHANCING CONFIDENTIALITY VIA LOGIC GATE ENCRYPTION," listing as inventors, Robert Michael Muchsel, Donald Wood Loomis, III., Edward Tangkwai Ma, Hung Thanh Nguyen, Nancy Kow Iida, and Mark Alan Lovell, and filed Jul. 10, 2017, which is a continuation of U.S. patent application Ser. No. 14/659,348, entitled "SYSTEMS AND METHODS FOR ENHANCING CONFIDENTIALITY VIA LOGIC GATE ENCRYPTION," listing as inventors, Robert Michael Muchsel, Donald Wood Loomis, III., Edward Tangkwai Ma, Hung Thanh Nguyen, Nancy Kow Iida, and Mark Alan Lovell, and filed Mar. 16, 2015, which is related to and claims the priority benefit of U.S. Provisional Patent Application No. 62/058,564, entitled "SYSTEMS AND METHODS FOR ENHANCING CONFIDENTIALITY VIA LOGIC GATE ENCRYPTION," listing as inventors, Robert Michael Muchsel, Donald Wood Loomis, III., Edward Tangkwai Ma, Hung Thanh Nguyen, Nancy Kow Iida, and Mark Alan Lovell, and filed Oct. 1, 2014, which applications, which applications are hereby incorporated herein by reference in their entireties and for all purposes.

BACKGROUND

A. Technical Field

The present invention relates to security applications in digital electronics and, more particularly, to systems, devices, and methods of encrypting digital logic gates.

B. Background of the Invention

Methods to reverse engineer physical IP are becoming increasingly powerful, automatable, and affordable. Today, sophisticated attackers can gain access to and reverse engineer secret encryption and decryption keys embedded in hardware without much effort. A complete, annotated, hierarchical netlist of a digital circuit can be obtained for less than $15,000. This includes circuits that cannot be patented or otherwise protected-exposing proprietary information. This creates a number of severe problems to chip manufacturers and their customers. A related problem is the exposure of keys due to theft and unauthorized distribution of devices. For example, a subcontractor might sell excess quantities of a manufactured device to others, or resell substandard devices that failed to conform to the contractor's manufacturing specifications under an alternate trade name.

As a consequence, manufacturers are forced to expend considerable time and money to develop countermeasures to deter adversaries. Numerous methods to encrypt, obfuscate, and hide information have been employed in the software domain for a long time. Until now, however, no equivalent methods have been feasible in the hardware domain. Nor does there exist any generation of hardware that would be capable of implementing such techniques.

What is needed are effective systems and methods that allow for the protection of valuable IP and information in the hardware domain, ideally, using automated procedures that are compatible with existing manufacturing tools and processes.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIG. ("FIG.") 1A shows a prior art truth table for a two-input NAND gate.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1A:
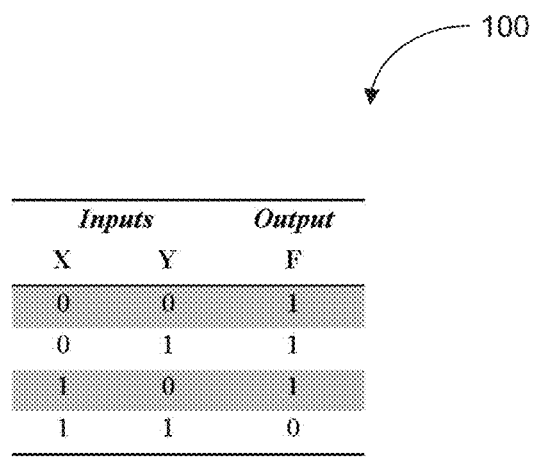
FIG. 1B shows prior art examples of logic functions expressed in NAND logic.

FIG. 1A shows a prior art truth table for a two-input NAND gate. It is well-known that digital logic can be expressed using basic blocks of logic elements, such as gates. At a very basic level, any arbitrary digital logic function can be implemented exclusively with NAND gates or NOR gates. In practice, a standard cell library contains more complex devices than just NAND gates, but the same principles apply. For a better understanding of the present invention, only simple gates are shown herein.

Figure 1B:
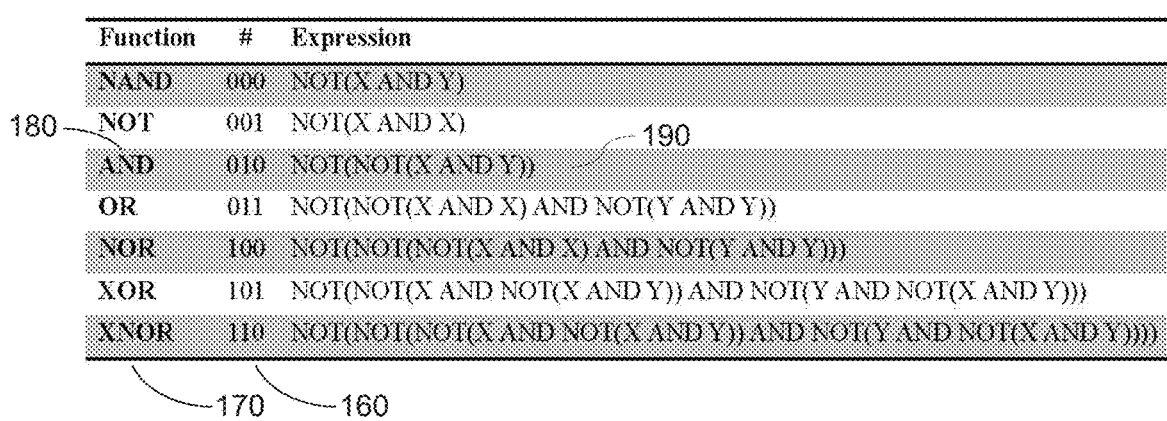

Truth table 100 in FIG. 1 shows output values, F, of a NAND gate for two inputs X and Y, indicating that the output of the logic function is determined by its inputs. Examples of logic functions expressed in NAND logic are shown in FIG. 1B. Logic values 160 can be chosen arbitrarily or by convention. A block of five NAND gates that are appropriately connected to each other can be used to output any of the logic functions 170 shown in FIG. 1B. As an example, the value #010 in table 150 represents AND function 180, which can be represented by expression NOT(NOT(X AND Y)) 190 if the appropriate combination of NAND gates is used. Based on this principle, any logic function can be expressed by combining multiple, basic NAND gates into larger logic building blocks.

Now, if the result of a logic function were determined not only by its inputs, but additionally by a key (subsequently called "logic key"), as suggested by the present invention, then the functionality of that logic function could not be determined by simply reverse engineering the logic function itself, because the logic key would remain unknown and the output of the logic function could take on any possible result.

A logic key is typically an encrypted key that can be stored, e.g., in a tamperproof storage element. In one embodiment of the invention, the logic key is used to determine the physical wiring for a given logic building block to, in effect, encrypt the logic building block. As a result, reverse engineering of the building block without knowledge of the logic key would show only that the building block can be used to express any possible logic function. However, a reverse engineered building block would not expose the actual function of the logic. The logic key may be used directly, i.e., without intermediate storage, such that each bit controls one logic element. In one embodiment, the logic key is created by decrypting data using a secret or private decryption key.

Figure 2:
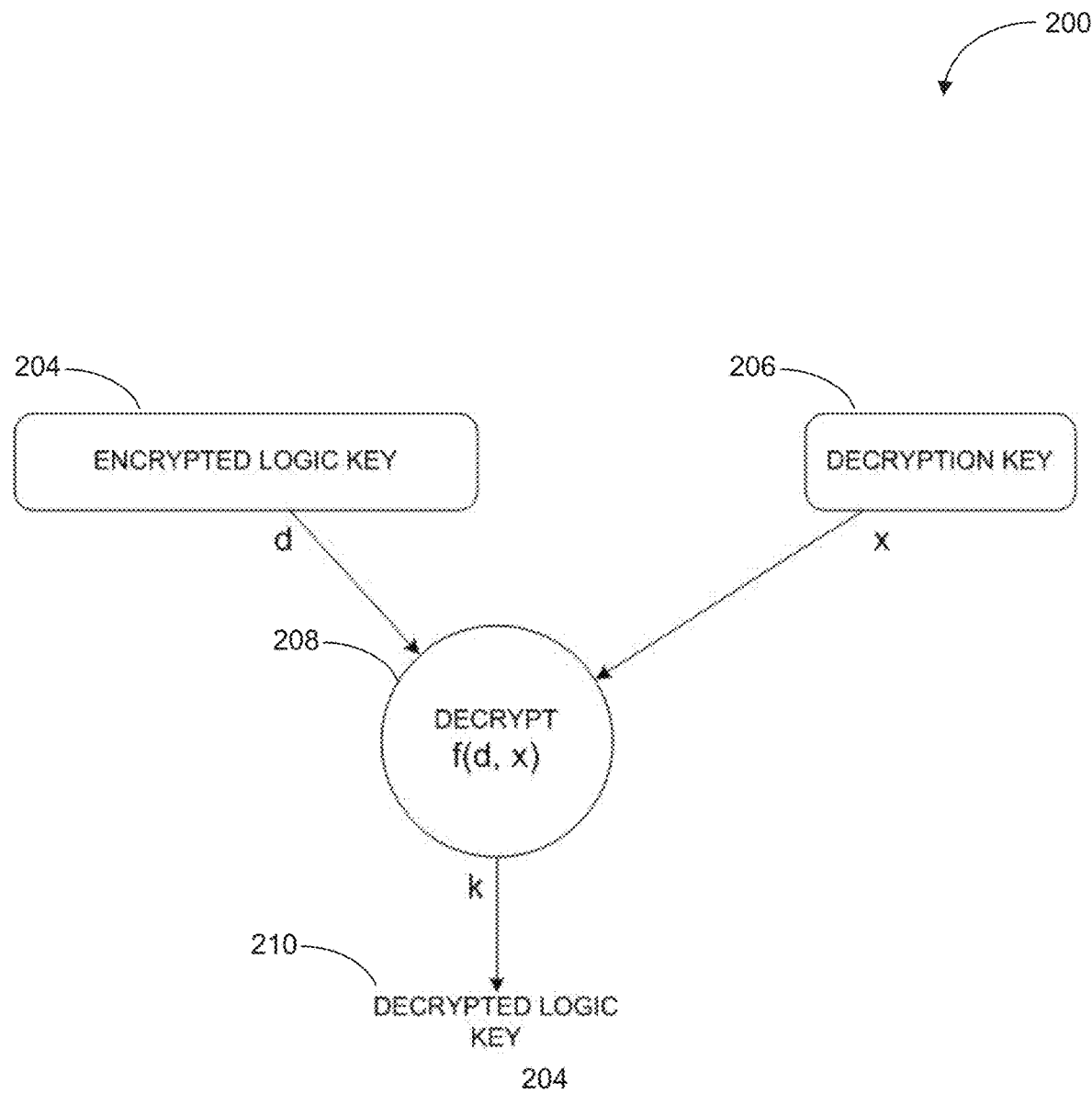
FIG. 2 is a general illustration for decrypting a logic key according to various embodiments of the invention.

FIG. 2 is a general illustration for decrypting a logic key, according to various embodiments of the invention. Encrypted logic key, d, 204 and decryption key, x, 206 are used to generate decrypted logic key, k, 210 using mathematical function f(d, x) 208. Logic key k 210 ultimately determines the appropriate connections for a given logic building block (not shown) as previously mentioned. Both secret decryption key, x, 206 (e.g., a secret or private key) and encrypted logic key, d, 204 are needed to compute k 210. In one embodiment, decryption key x 206 has different length than decrypted logic key 210. For example, x may be a 128-bit AES key that is used to decrypt a relatively larger logic key k 204. One of ordinary skill in the art will appreciate that both symmetric as well as asymmetric cryptography may be used.

Encrypted logic key 204 may be stored in a secure memory. Another example of an indirectly storing the logic key will be discussed with respect to FIG. 10. A person of ordinary skill in the art will appreciate that each approach has its own advantages depending on the implementation and the particulars of a given system. One of ordinary skill in the art will also appreciate that there are numerous possibilities how logic building blocks can be arranged and implemented, only some of which are discussed in detail herein.

In one embodiment, encrypted logic key d 204 is automatically determined for a given to-be-encrypted logic circuit, for example, a two-dimensional x-y circuit that performs a sensitive algorithm. Ideally, the algorithm has been tested and its proper working condition had been verified.

Figures 3A, 3B:
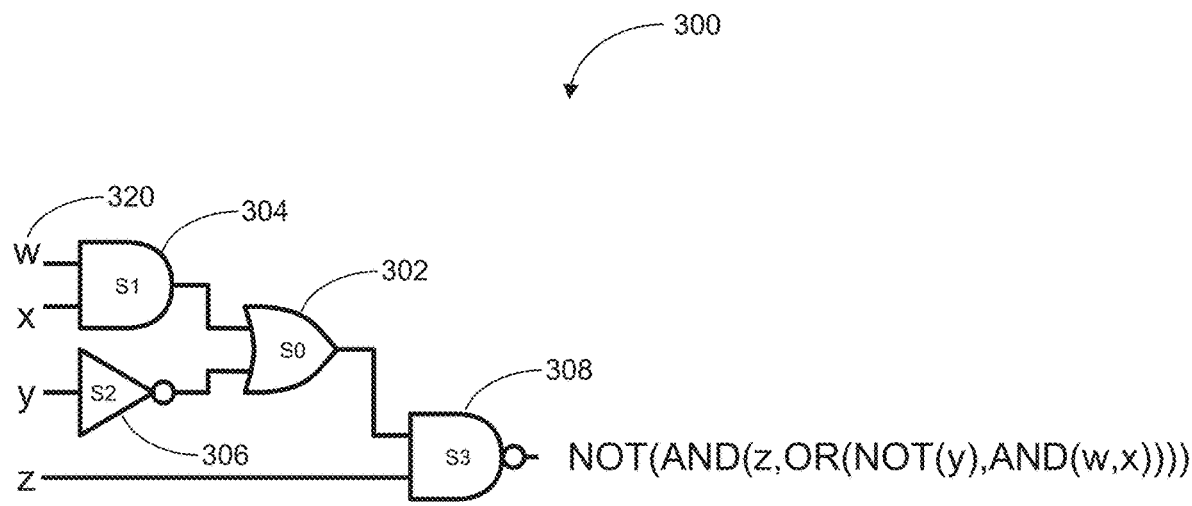
FIG. 3A shows an exemplary logic function with four logic gates.
FIG. 3B illustrates the logic key bits for the example logic function in FIG. 3A, according to various embodiments of the invention.

FIG. 3A shows an exemplary logic function having four logic gates. The four logic gates 302-308 in digital logic 300 are connected with each other as shown in FIG. 3A, and are labeled by their serial numbers S0 302 through S3 308, wherein S0 302 is an OR gate, S1 304 is an AND gate, S2 306 is a NOT gate, and S3 308 is a NAND gate. For any given input 320 w, x, y, and z, logic 300 outputs the function NOT(AND(z, OR(NOT(y), AND(w,x)))). Logic key bits 360 corresponding to each logic gate type 370 are displayed in FIG. 3B, according to various embodiments of the invention. The concatenation of logic key bits 360 yields the complete logic key for the example function, here, 011010001000.

Figure 4:
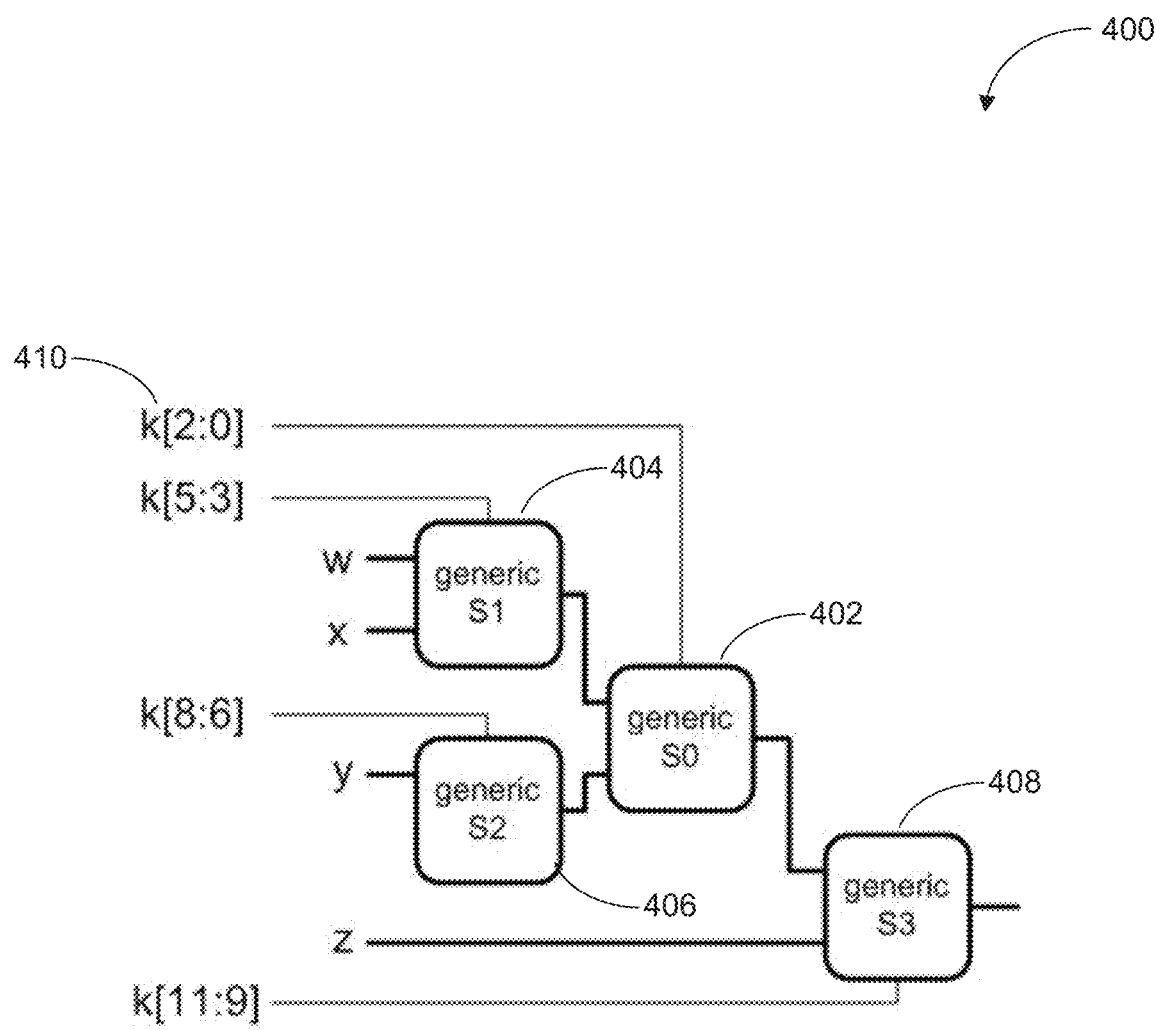
FIG. 4 illustrates an example logic function using generic logic blocks according to various embodiments of the invention.

The logic gates identified in the original design in FIG. 3A may be replaced with generic logic blocks, such that logic 300 comprising the four logic gates 302-308 will appear as shown in FIG. 4, according to various embodiments of the invention. In the example in FIG. 4, each logic gate has been replaced with a corresponding generic logic block 402-408. Generic logic block 402-408 represents a universal logic gate. For this purpose, first, the logic gates used in the logic function in FIG. 3A may be serialized into a sequence in order to create a known sequence of the circuit. Serialization and synthesis of the logic function may be accomplished automatically, for example, by using commercially available tools that can generate an ordered string of gates. This serialization is similar to the process used by known scan mechanisms that are used to create scan chains. Each type of logic gate or a subset thereof (e.g., OR) is analyzed and a sequence of key bits k[i:j] 410 is assigned to it. The identified logic gates or blocks in the original design are then removed and replaced with generic building blocks 402-408 that are capable of performing the equivalent function (here, k[2:0]=#011=OR). As a result, a replaced AND gate, for example, cannot be distinguished from an OR gate.

While generic building blocks 402-408 can be configured to perform certain desired functions, configuration 400 in FIG. 4 is of no use to the attacker, unless building blocks 402-408 are also properly configured with the information that was previously contained in the now replaced logic gates, such that the logic can perform its intended function. In one embodiment, the key bits that have been recorded are loaded back into the silicon using a scan chain to shifting the bits accordingly. This has the advantage that the order of bits remains intact, thereby, eliminating the need to transpose between different orders.

In one embodiment, configuration information represented by key bits 410 is stored, in a tamperproof memory, for later use as a decryption key. Upon a power-up condition, or as needed, a state machine or software may extract key bits 410 from the tamperproof memory and shift them into their corresponding logic gates. As a result, logic function 400 regains the properties of the logic function shown in FIG. 3A and, thus, operates in the desired manner.

It is noted that the process of replacing generic building blocks 402-408 may be repeated for any and all remaining logic gates in the sequence. One advantage of an automated, computer-controlled replacement process is that it eliminates the need to re-implement or re-build an existing circuit that is to be protected. One of ordinary skill in the art will appreciate scan chains and serialized logic may be combined in the creation step and in the hardware implementation. An example of the details of each generic block, e.g., S1 404 is provided in FIG. 5.

Figure 5:
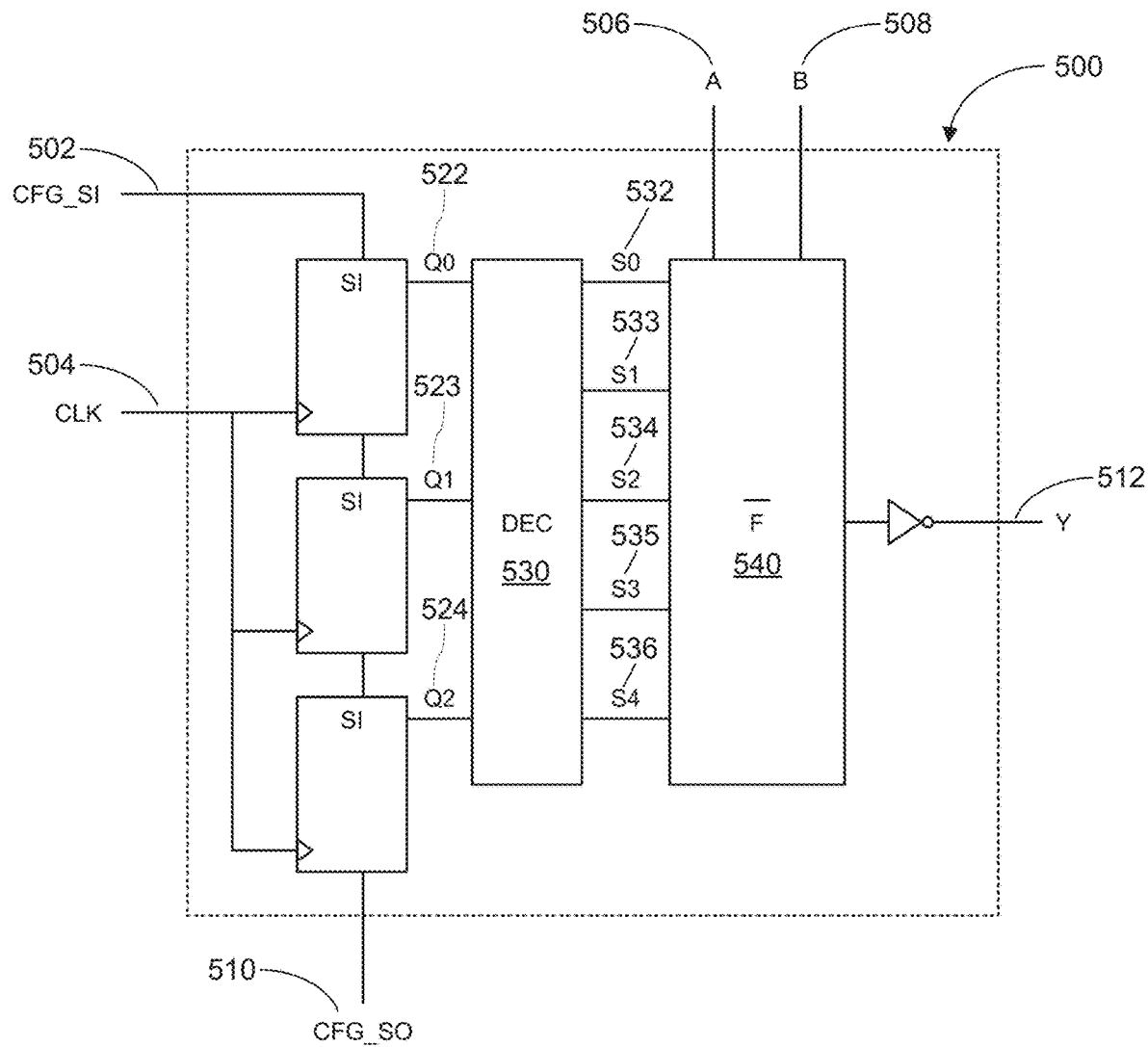
FIG. 5 illustrates a general-purpose configurable logic cell according to various embodiments of the invention.

FIG. 5 illustrates a general-purpose configurable logic cell according to various embodiments of the invention. In the implementation shown in FIG. 5, logic cell 500 comprises external input signals 502-508 and output signal 512, including clock signal 504. Decoder 530 decodes input signals Q0-Q2 522-524 into function $\overline{F}$ 540. Function $\overline{F}$ 540 is, for example, an AND function that receives gate signals S0-S4 532-536 from the output of decoder 530 and input signals A and B 506 and 508 and generates therefrom output signal Y 512. One of ordinary skill in the art will appreciate that logic cell 500 may be designed to process any number of bits in serial and/or parallel configuration, and that many variations of loading and configuring functions are possible.

Figure 6:
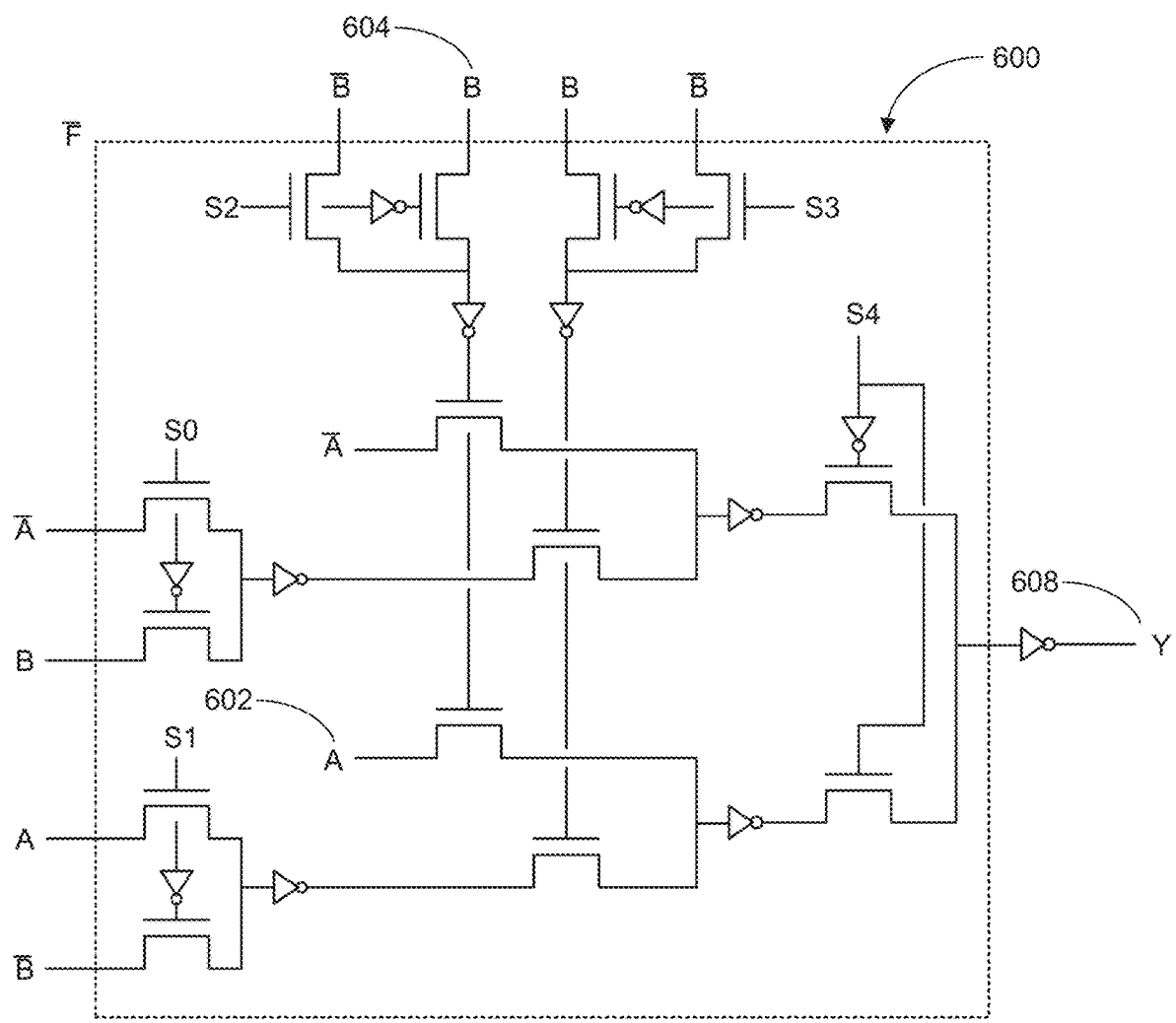
FIG. 6 illustrates details of the general-purpose configurable logic cell shown in FIG. 5, according to various embodiments of the invention.
Figure 7:
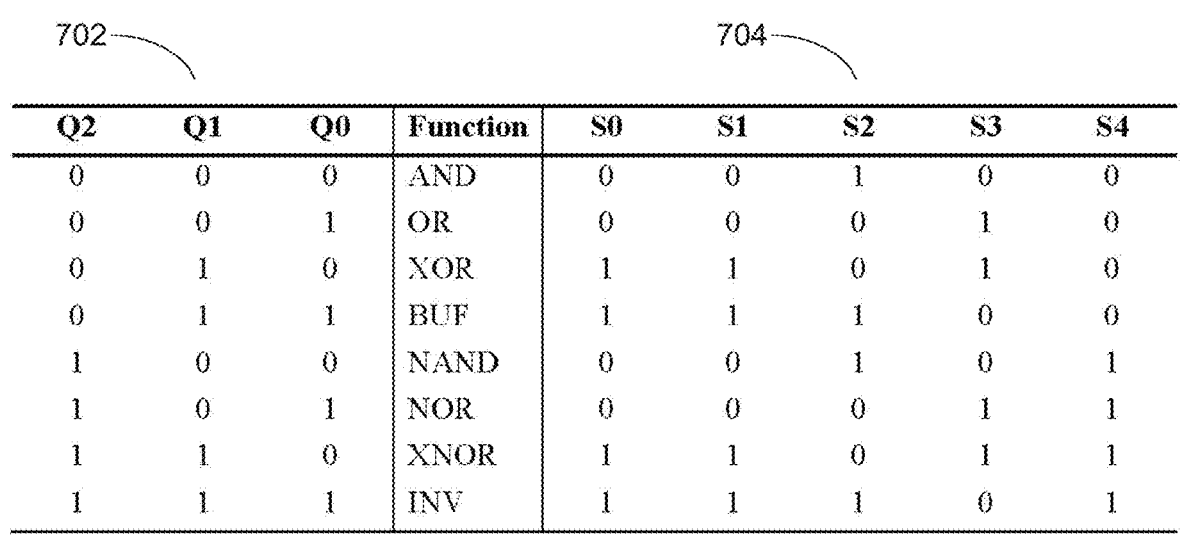
FIG. 7 illustrates an exemplary logic cell configuration for the general-purpose configurable logic cell of FIG. 5 and FIG. 6, according to various embodiments of the invention.
Figure 8:
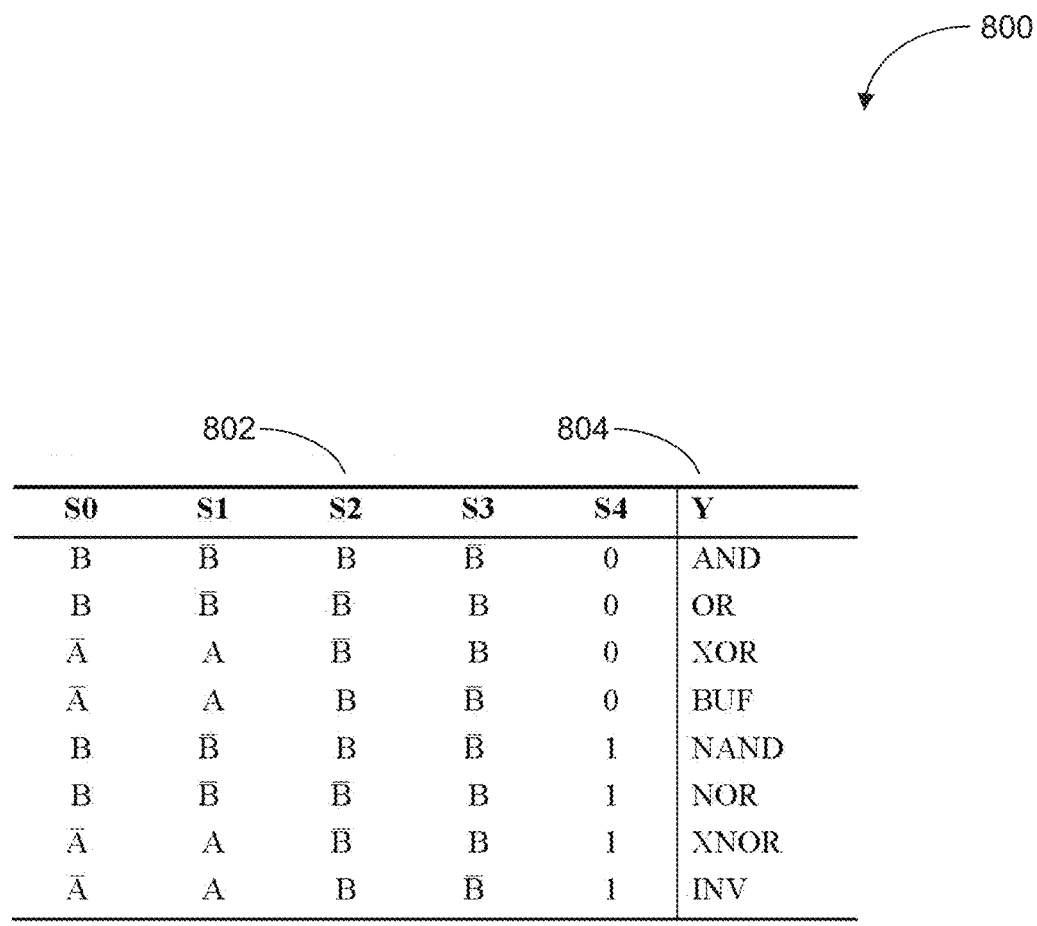
FIG. 8 is an exemplary logic cell output for the general-purpose configurable logic cell of FIG. 5 and FIG. 6, according to various embodiments of the invention.

FIG. 6 illustrates details of the general-purpose configurable logic cell shown in FIG. 5, according to various embodiments of the invention. In particular, details of function $\overline{F}$ 540 are shown. A and B 602-604 are the actual inputs to function $\overline{F}$ 540, and Y 608 is the output. Tables 700 and 800 shown in FIG. 7 and FIG. 8 describe the configurable logic cell according to various embodiments of the invention. Input 702 and output 704 of the decoder are displayed in FIG. 7. Input 802 and output 804 of the function are displayed in FIG. 8 accordingly.

Returning to FIG. 4, to decrypt logic 400, at system startup, during runtime, or on demand, logic key bits 410 are loaded into the logic building blocks 402-408 in the same order as previously used to encrypt the logic function. This configures logic building blocks 402-408 and causes them to behave like the original logic function shown in FIG. 3A.

In scenarios where there are any errors in logic key bits 410, logic building blocks 402-408 will perform unknown or invalid operations. In one embodiment, a built-in self-test (BIST) is performed upon power-up and combined with the loading of logic key bits 410 so as to take advantage of the fact that both the BIST and the key loading make use of serialized logic by, e.g., a logic scan. The effect decrypting a logic function by using an invalid or wrong key is illustrated in FIG. 9, according to various embodiments of the invention.

Figure 9:
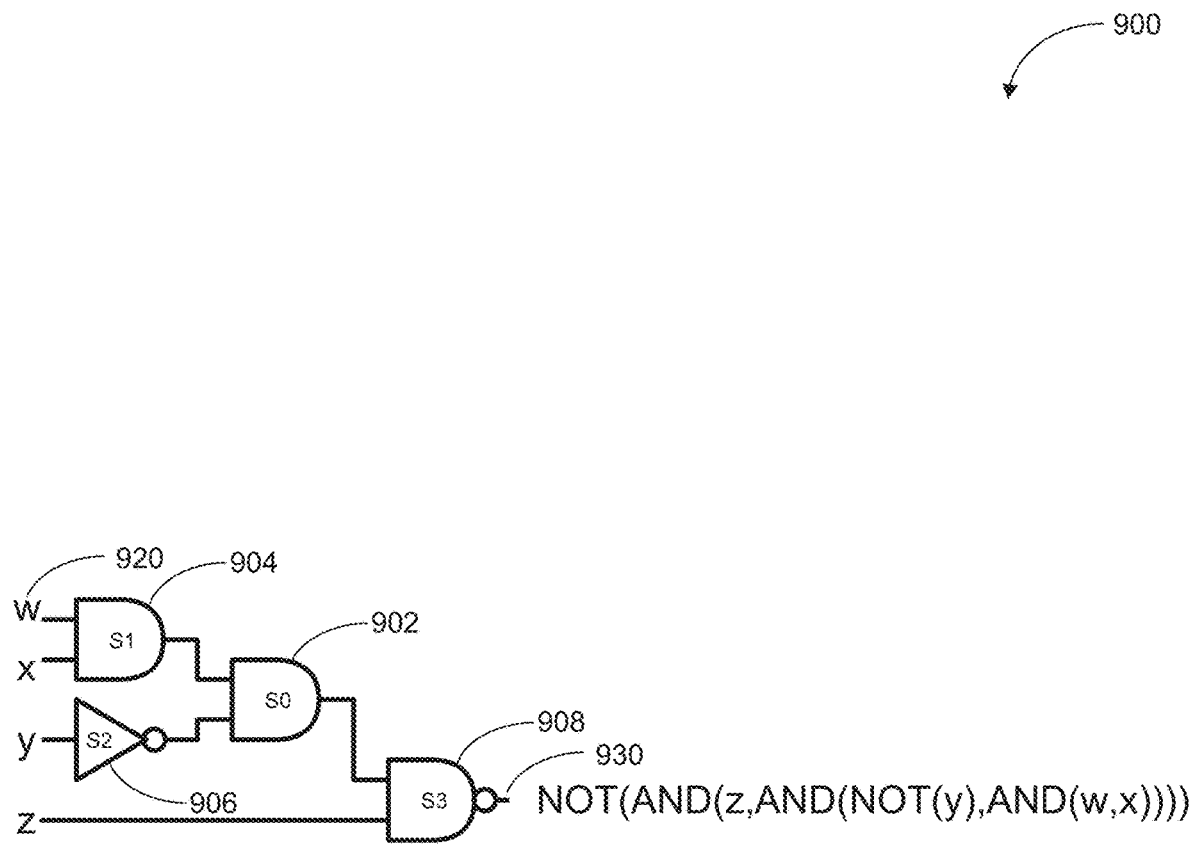
FIG. 9 illustrates the effect decrypting a logic function by using an invalid or wrong key.

FIG. 9 comprises logic function 900 that uses generic logic blocks that represent an erroneous logic key 010010001000 instead of the correct logic key 011010001000. As shown in example in FIG. 9, the attempt to decrypt logic function 900 by applying an invalid logic key that has a single bit error results in the wrong logic expression NOT(AND(z, AND(NOT(y), AND(w,x)))).

While output 930 may still be some operational logic function, i.e., using other keys may or may not result in some operational logic, it is not the desired logic function that can perform the operation the system was designed for. In other words, if there is any error in the logic key bits, the entire logic function is rendered invalid, such that logic building blocks 902-908 will output unknown or invalid operations.

It is noted that unlike field programmable gate arrays, this system does not have to be designed to be capable of expressing more than one arbitrary logic function during runtime. Typically, only the originally designed, valid logic function is activated, while all other incorrect combinations are inactive. Additionally, errors in logic key bits may cause system latch-up and other violations. Therefore, in one embodiment, generic logic blocks are specifically designed to avoid these unwanted effects.

Regarding testability in manufacturing, the desired function is tested and verified as correct, while any undesired invalid (i.e., wrongly configured) function does not have to be tested except to the extent required to ensure reliable operation of the correct function. For example, the logic key bits could be loaded to unlock the logic function, and scanning could be performed just as it would in a regular test flow to verify correct timing. For incorrect logic functions, the circuit may be tested to ensure that the incorrect logic does not permanently negatively impact the system (e.g., by causing a destructive latch-up). It is noted that, unlike for the correct function, timing is of no concern and may or may not be met for incorrect functions.

While the invention as described above results in a powerful hurdle for reverse engineering, additional steps may be taken to protect the keying material to make it inaccessible to potential intruders. In one embodiment, the logic key that holds the secret is therefore stored in a tamper-resistant, battery-backed non-volatile memory. Indirect storage of the logic may be achieved by employing alternatives that do not require a battery. One embodiment uses Physically Uncloneable Functions (PUFs) as secure physical elements. A PUF is typically a random, device-unique but constant number that may change as soon as the device is being probed. Therefore, such unique identification elements serve as excellent encryption keys.

Figure 10:
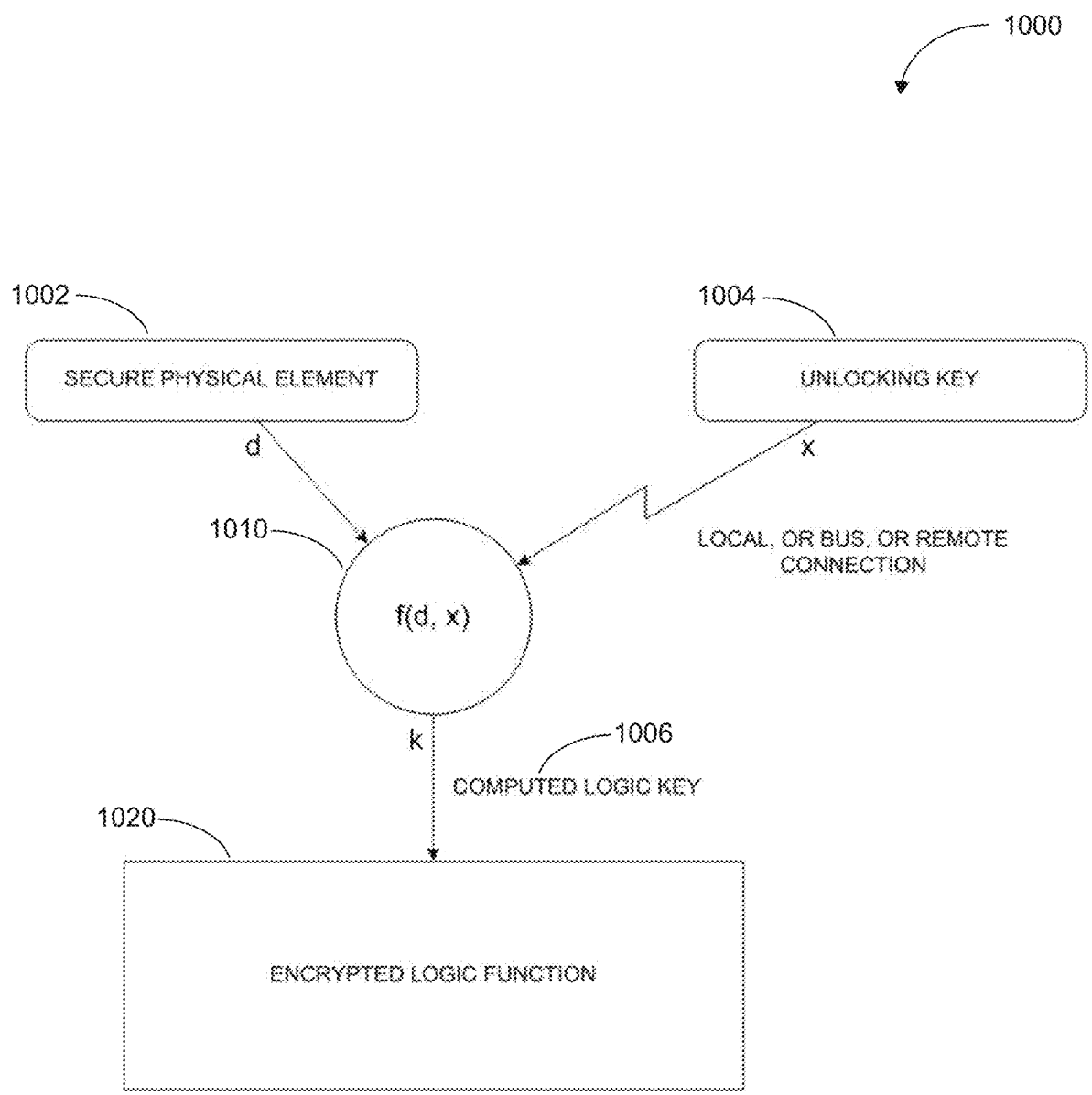
FIG. 10 illustrates logic key protection using a secure physical element according to various embodiments of the invention.

Logic key protection using a secure physical element is illustrated in FIG. 10, according to various embodiments of the invention. PUF 1002 provides a device-unique unique secure physical element, d, that is determined by the hardware of a particular device. PUF 1002 may be used to secure the secret key. Unlocking key 1004 (denoted as x) is pre-computed based on the non-secure physical element and the secret or private key. This unlocking key 1004 may be different from device to device, such that even if an attacker manages to extract unlocking key 1004 from one chip, it would be of no use, since unlocking key 1004 is individualized to each device. Logic key k 1006 comprises key bits computed previously. Mathematical function f(d, x)=k 1010 can be designed in a manner that its inverse function delivers a value for unlocking key x 1004, i.e., $f^{-1}(d, k)=x$. Then, for a given PUF d 1002 and logic key k 1006, unlocking key x 1004 can be computed from $x=f^{-1}(d, k)$.

One simple example used for illustrative purposes is an XOR operation. Assuming that x=(d XOR k), then k=(d XOR x), i.e., both PUF d 1002 and unlocking key x 1004 are needed to calculate logic key k 1006. In other words, because x 1004 is dependent on PUF d 1002, PUF d 1002 is needed to compute k from unlocking key x 1004. But this also means that unlocking key x 1004 is computable, since all the necessary information is known or determinable. In particular, logic key k 1006 is known from designing the function, and the value of PUF d 1002 can be determined from measurements, for example, as part of the manufacturing process. Given PUF d 1002 and logic key k 1006, unlocking key x 1004 can be computed from $x=f^{-1}(d, k)$. In practice, strong cryptographic functions $f_c( )$ rather than XOR are used.

The value of unlocking key x 1004 may then be stored, for example, inside the device's OTP, Flash memory, battery-backed SRAM or other non-volatile memory. For a potential attacker, the value of obtaining unlocking key x 1004 is extremely low since, by itself, unlocking key x 1004 cannot be used to activate other devices. Nor does unlocking key x 1004 unlock the logic function of the device.

In one embodiment, at device startup, or upon use of the logic function, the device computes logic key k 1006 as k=f(d, x) and loads (i.e., shifts) logic key k 1006 into the logic block configuration, thereby activating the correct logic function. As an advantage, only unlocking key x 1004 needs to be stored on the chip, and not secret key k 1006 itself, such that logic key k 1006 is successfully obfuscated. Note that if k were stored directly, PUF 1002 would not have any bearing on key k 1006. One of ordinary skill in the art will appreciate that a multitude of functions of varying speeds, sizes, and more complex cryptographic properties can be used, including public key cryptography.

In one embodiment, the system described in FIG. 10 is extended such that encrypted logic function 1020 is not automatically activated upon power-up or upon first use. Instead, the value of unlocking key x 1004 is transmitted to the logic building blocks, for example, by using a bus connection to a microprocessor, a remote link such as a network connection to an external server, or similar. This allows for protection of logic functions based on achieving an overall secure environment as determined by other system components, as well as implementation of hardware licensing features that have not been available using traditional designs. For example, remote decryption could be made contingent upon the satisfaction of licensing requirements such as the receipt of licensing fees, etc.

Figure 11A:
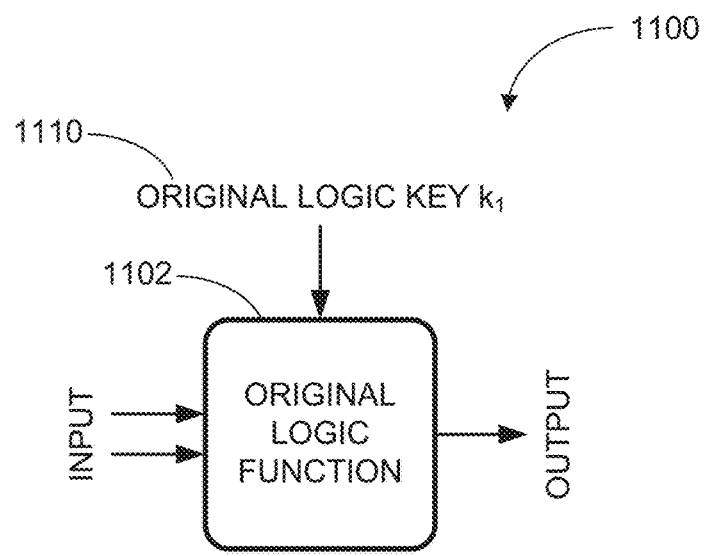
FIG. 11A and 11B illustrate the computation of equivalent information from an original logic function, according to various embodiments of the invention.
Figure 11B:
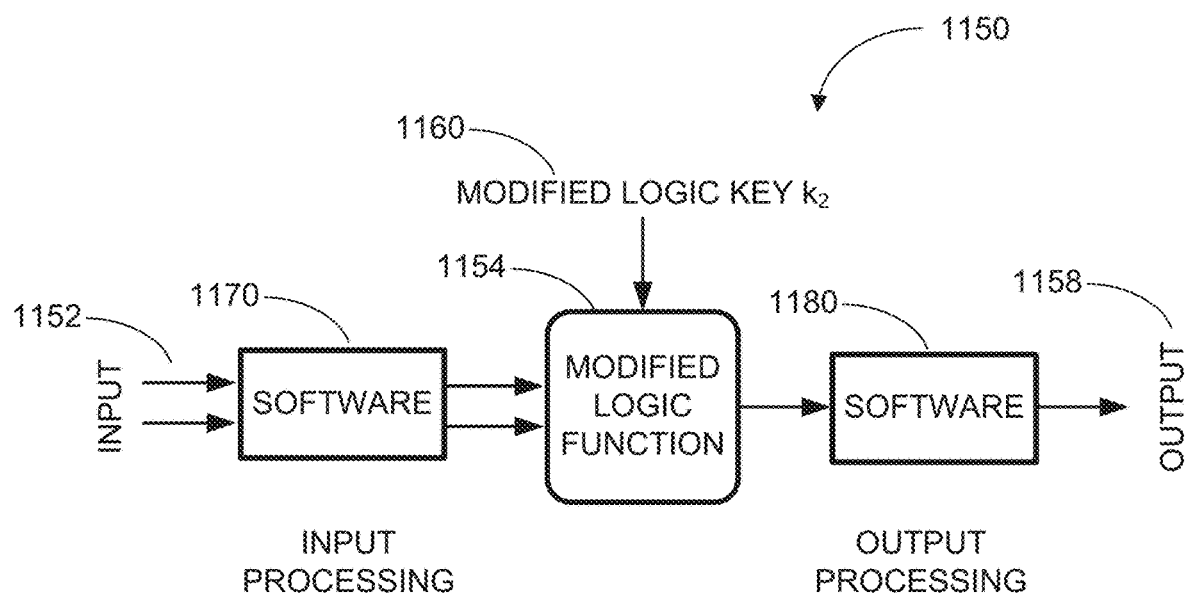

FIG. 11A and 11B illustrate the computation of equivalent information from the original logic function, according to various embodiments of the invention. In the absence of secure physical elements, there is typically only a single logic key for any given type of silicon die. Theft or accidental exposure of the logic key would negate many of the benefits of the systems and methods discussed herein. Therefore, in one embodiment, modified logic function 1154 is used instead of original logic function 1102 and software operations are performed at the inputs and outputs of modified logic function 1154 such that the overall behavior of system 1150 is the equivalent of that of system 1100.

Moving certain logic operations on inputs and outputs of a logic function into software allows the use a different logic key $k_2$ 1160 instead of original logic key $k_1$ 1110 and, thus, provides additional control over logic keys. Multiple pairs of keys and software may be used in computing the equivalent information. In one embodiment, software library enables software operations 1170 and 1180 on the inputs and outputs of logic function 1154, respectively, to negate a predetermined number of the input bits 1152 to logic function 1154 by inverting corresponding generic logic blocks such that the results computed by logic function 1154 are identical to results of non-inverted inputs computed with a different software library. As illustrated in FIG. 11B, a similar configuration may be applied at the output 1158 of logic function 1154.

Figure 12:
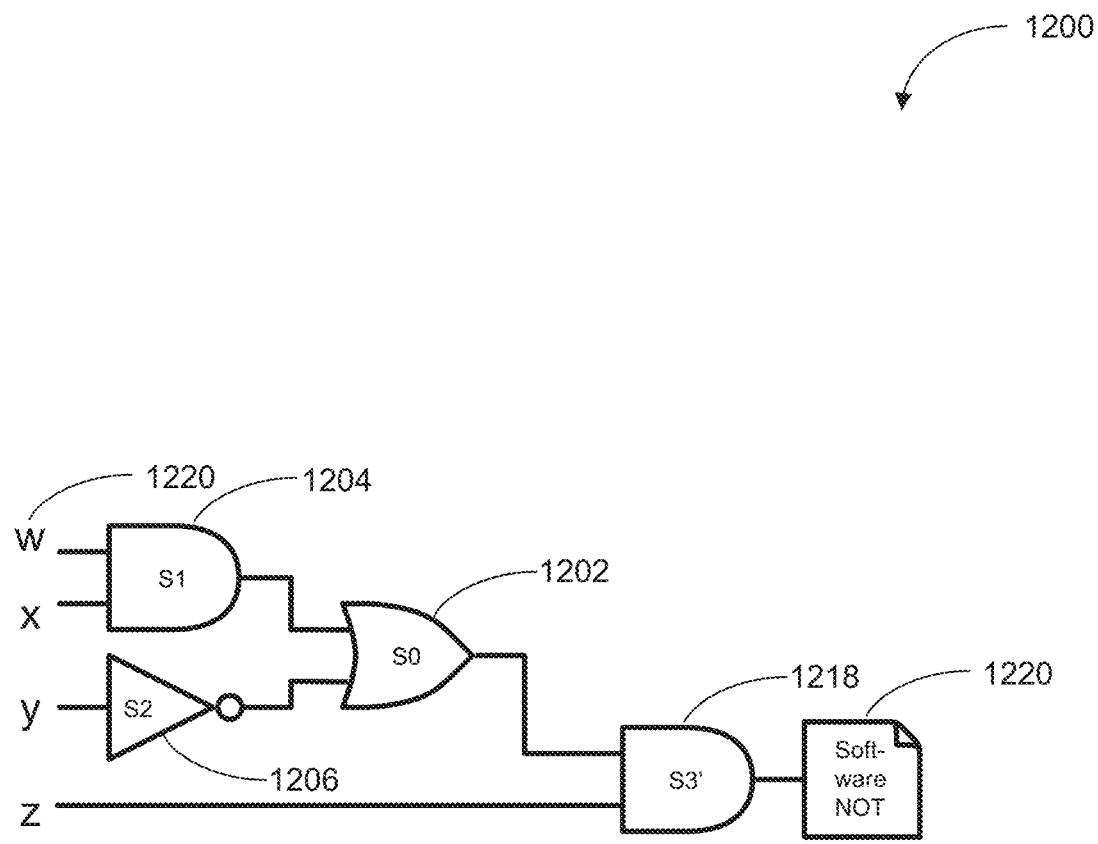
FIG. 12 illustrates software processing as applied to a modified version of logic function of FIG. 3A, according to various embodiments of the invention.

FIG. 12 illustrates software processing as applied to a modified version of logic function of FIG. 3A, according to various embodiments of the invention. As shown, logic function 1200 comprises the same elements as in FIG. 3A, except that the original generic logic block S3 has been replaced with a different output gate 1218. In example in FIG. 12, the logic key has been changed from 011010001000 to 011010001<u>010</u>. In other words, only the last element in the chain has been replaced by simply inverting it. In addition, software processing 1220 is applied to the output for the purpose of inverting the output of modified gate 1218.

In operation, the software bit inversion results in equivalent processing as that in example in FIG. 3A. This allows, for example, a manufacturer to give to two different customers two different logic keys, wherein one logic key creates the inverted output of the other, such that both customers receive two different versions of software and a small code is used to negate the effect of the hardware change. As a result, both customers receive different secret keys, so that the device of one does not operate with the secret key of the other, thus, discouraging the sale of devices. One of ordinary skill in the art will appreciate that more complex logic operations other than inversion can be used.

Some embodiments of the present invention may greatly increase the gate count of a logic implementation, e.g., by a factor of five, and result in a decrease of the achievable speed. Therefore, in one embodiment, the systems and methods of the present invention are applied only to critical blocks in a given design. In another embodiment, custom cells are used to reduce the footprint of individual generic logic blocks. In yet another embodiment, a subset of the chip design is run at reduced clock speeds to reduce the required die area and/or mitigate the impact of an increased gate count.

Figure 13:
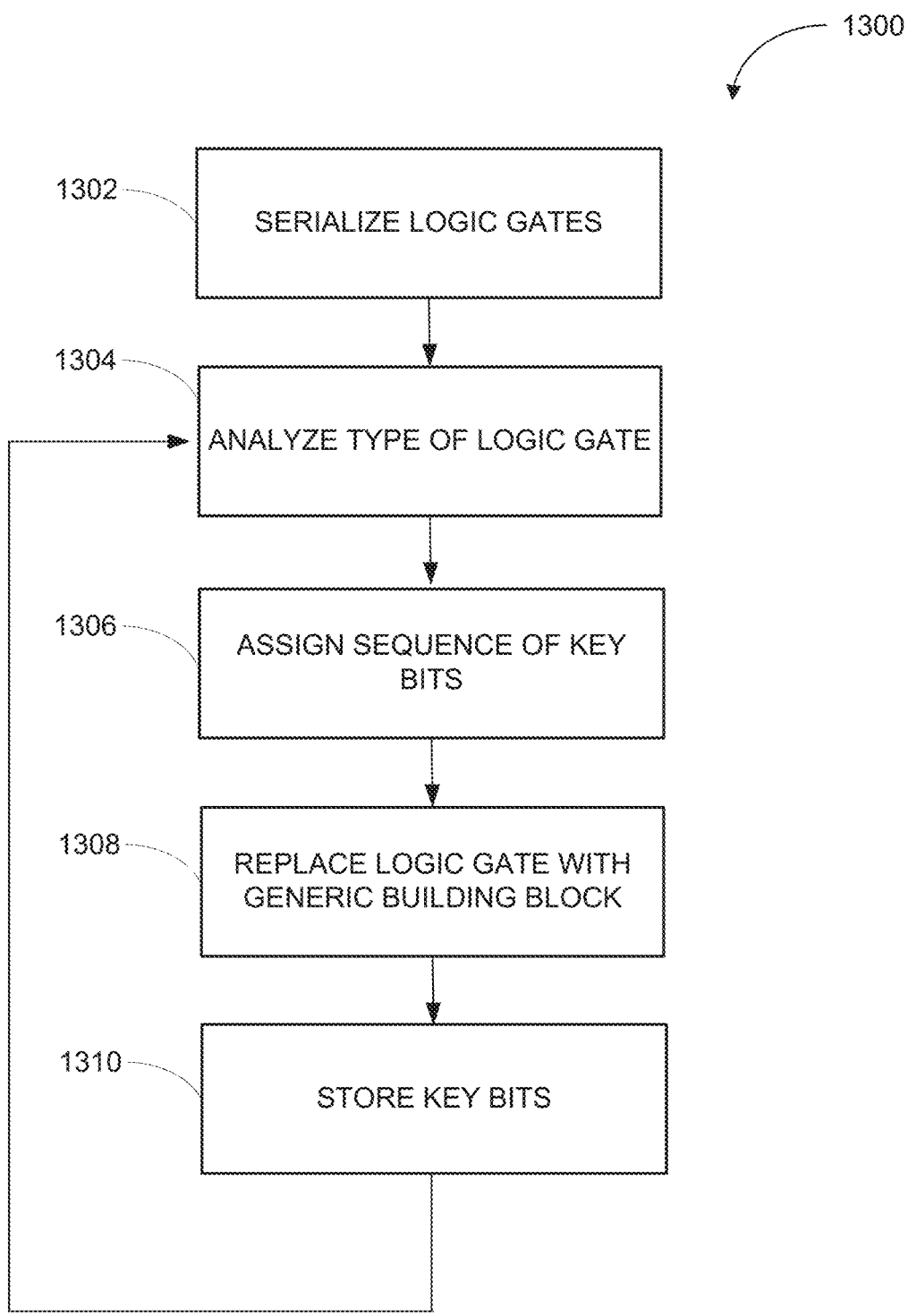
FIG. 13 is a flowchart of an illustrative process to determine a logic key in accordance with various embodiments of the invention.

FIG. 13 is a flowchart of an illustrative process to determine a logic key in accordance with various embodiments of the invention. The process for determining the logic key 1300 starts at step 1302 when logic gates used in a given logic function are serialized into a sequence to generate a known sequence of, e.g., a two-dimensional x-y circuit.

At step 1304, each type of logic gate used is analyzed and identified.

At step 1306, a sequence of key bits is obtained and assigned to the logic gate, such that a generic logic building block can perform the equivalent function.

At step 1308, the logic gate is replaced with a generic logic gate or building block.

At step 1310, key bits are stored, e.g., in a database.

Finally, steps 1304 through 1310 are repeated for some or all of the remaining logic gates in the sequence.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A configurable logic cell to increase confidentiality via logic gate encryption, the logic cell comprising:
a reconfigurable circuit comprising one or more reconfigurable logic building blocks that comprise logic gates, the reconfigurable circuit is configured to perform functions equivalent to a non-reconfigurable circuit that has been assigned key bits.

2. The configurable logic cell according to claim 1, wherein the reconfigurable logic building blocks are indistinguishable from each other.

3. The configurable logic cell according to claim 1, wherein the key bits have been serialized into a known sequence of the non-reconfigurable circuit.

4. The configurable logic cell according to claim 1, wherein the one or more reconfigurable logic building blocks comprise a universal logic gate.

5. The configurable logic cell according to claim 1, wherein key bits are stored in a tamperproof storage element.

6. The configurable logic cell according to claim 5, wherein a concatenation of the key bits yields an unlocking key.

7. The configurable logic cell according to claim 6, wherein the unlocking key has been pre-computed based on a non-secure physical element and one of a secret and a private key.

8. The configurable logic cell according to claim 1, wherein the reconfigurable logic building blocks are configured to record the key bits such that the sequence of the key bits corresponds to the sequence of logic gates.

9. The configurable logic cell according to claim 1, further comprising a predetermined number of inverting elements at inputs of reconfigurable logic blocks.

10. A method to increase confidentiality via logic gate encryption, the method comprising:
assigning key bits to logic gates; and
replacing one or more logic gates of a non-reconfigurable circuit with reconfigurable logic building blocks, such that the reconfigurable logic building blocks perform functions equivalent to the non-reconfigurable circuit according to the key bits.

11. The method according to claim 10, wherein a sequence of logic gates has been obtained by serializing the one or more logic gates.

12. The method according to claim 10, associating a sequence of key bits with a mathematical function whose inverse provides a value for an unlocking key.

13. The method according to claim 12, further comprising recording the key bits into the reconfigurable logic building blocks such that the sequence of key bits corresponds to a sequence of logic gates.

14. The method according to claim 13, wherein the sequence of logic gates represents a logic function.

15. The method according to claim 12, further comprising performing a self-test when loading of the sequence of key bits into the reconfigurable logic building blocks to configure the reconfigurable logic building blocks.

16. The method according to claim 10, further comprising generating a decrypted logic key from an encrypted logic key and a decryption key.

17. The method according to claim 16, wherein the decrypted logic key and the decryption key have a different length.

18. The method according to claim 10, further comprising performing a software bit inversion that generates an inverted output.

19. The method according to claim 10, further comprising storing the key bits in a device-unique secure physical element.

20. The method according to claim 16, further comprising using the encrypted logic key to determine physical connections for a logic building block to encrypt the logic building block.

* * * * *